3,221,073
PURIFICATION OF OLEFINS
George D. Davis and Earle C. Makin, Jr., both of St. Louis, Mo., assignors to Monsanto Company, a corporation of Delaware
No Drawing. Filed Oct. 27, 1961, Ser. No. 148,056
14 Claims. (Cl. 260—677)

The present invention relates to a process for the purification of olefin hydrocarbon containing more unsaturated hydrocarbon impurities. Particularly, the present invention relates to a process for the removal of diolefin and/or acetylenic hydrocarbon impurities from olefin streams by the selective polymerization of the diolefin and/or acetylenic hydrocarbon impurities.

Selective polymerization as a method for purifying olefin and other hydrocarbon streams is old in the art. This method of purifying olefin streams has not been completely successful commercially, primarily due to the failure of known polymerization catalysts to provide the requisite degree of selectivity and at the same time produce a polymerization product of value. A number of known catalysts provide a relatively high selectivity in polymerization but the polymerization products are high molecular weight tars and pitches which are of little or no value. Further these high molecular weight polymers tend to cause catalyst deactivation, plugging and other such deleterious effects.

It is then an object of the present invention to provide a process for the purification of olefin hydrocarbon streams containing more unsaturated hydrocarbon impurities. A further object of the present invention is to provide a process for selective polymerization of diolefin and/or acetylenic hydrocarbon while such hydrocarbons are in admixture with olefin hydrocarbons. Another object of the present invention is to provide a process for the production of aromatic hydrocarbons by the polymerization of diolefinic and/or acetylenic hydrocarbons. A particular object of the present invention is to provide a process for the purification of olefin hydrocarbon streams containing diolefin and/or acetylenic hydrocarbons as impurities whereby these impurities are selectively polymerized to yield low molecular weight aromatic hydrocarbon products. Additional objects will become apparent from the following description of the invention herein disclosed.

In fulfillment of the above and other objects, the present invention comprises passing an olefin hydrocarbon stream containing diolefin and/or acetylenic hydrocarbons as impurities into contact with a particular modified crystalline alkali and/or alkaline earth metallo-alumino-silicate zeolite at a temperature of 100 to 400° C., a pressure of atmospheric to 500 p.s.i.g. and a space velocity of 50 to 1000 gaseous volumes of feed per hour per volume of zeolite. The particularly modified metallo-alumino-silicate crystalline zeolite is one in which at least a part of the alkali and/or alkaline earth metal ions contained in the zeolite have been exchanged with ions of polymerization promoting metals such as zinc, cadmium, mercury, silver, copper, nickel, cobalt, etc. The crystalline zeolites contemplated herein have a relavitely high surface area of approximately 200 to 1200 square meters per gram and have pore diameters of not less than 6 nor more than 15 angstroms.

Crystalline zeolites are both naturally occurring and synthetic. They possess innumerable internal cavities with entrance pores of uniform size. These zeolites vary somewhat in composition, but generally contain the elements silicon, aluminum and oxygen as well as alkali and/or alkaline earth metal elements, e.g., sodium, potassium and/or calcium, magnesium, etc. The commercially available crystalline zeolites are generally synthetic sodium and calcium-alumino-silica crystals. As synthesized, the crystals contain water of hydration which is driven out by heating. The removal of the water results in a geometric network of empty cavities connected by channels. These zeolites are particles ranging in size from 1 to 5 microns in diameter. The particles may be bound together by a suitable binding material to form various size pellets. Each particle is a single crystal containing literally billions of tiny cavities interconnected by channels and opening externally by means of pores. These channels and pores are essentially uniform in size for a particular zeolite but may, in different zeolites, vary from 3 to 15 angstroms. Molecules having critical diameters less than the pore diameters of the zeolites are able to enter the internal cavities while those molecules having critical diameters larger than the pore diameters of the zeolites are excluded from the internal cavities. As a result of this property these crystalline zeolites have become known as molecular sieves.

Additional information regarding the composition of zeolites and their method of preparation is presented by Kimberlin and Mattox in U.S. Patent 2,972,643.

The present invention is very aptly illustrated by the following example. This example is not to be construed in any manner as limiting the present invention.

EXAMPLE I

Approximately 630 grams of a sodium-calcium-aluminosilicate having intercrystalline cavities and external pores of 13 angstroms diameter and known commercially as Linde Type 13X molecular sieve were totally immersed in a solution comprising 26.5 grams of zinc chloride and 1000 mls. of water. Very mild agitation was applied to the resulting mixture. After approximately 24 hours the molecular sieve was recovered from the solution by decantation. The temperature throughout the immersion period was approximately 25–50° C. The recovered molecular sieve was next thoroughly water washed and then dried for several hours at a temperature of 120 to 300° C. After drying, hydrogen was passed over the molecular sieves at 350 to 450° C. The modified molecular sieve thus prepared contained approximately 1.9 weight percent zinc.

A predominantly $C_3$ hydrocarbon mixture of the composition given in Table I below was passed into contact with approximately 65 grams of the above prepared zinc containing molecular sieve. Contact was maintained for 6 hours at a flow rate of 100 gaseous liters per hour per liter of molecular sieve. The temperature during the contact was approximately 250° C. and the pressure approximately atmospheric. At completion of the 6 hour contacting period, the molecular sieve bed was desorbed by heating to about 500° C. and passing nitrogen over the bed for several minutes. The collected gaseous hydrocarbon effluent represented a recovery of 97.8 weight percent of the feed. The desorbed liquid hydrocarbons represented 1.3 weight percent of the feed. The gaseous effluent was analyzed and found to have the composition given in Table I below.

Table I

| Component, Wt. percent | Feed | Effluent |
|---|---|---|
| Ethane | 0.12 | 0.13 |
| Propane | 4.18 | 4.13 |
| Butane | 0.60 | 0.30 |
| Propylene | 92.66 | 94.97 |
| Butylenes | 0.53 | 0.27 |
| Propadiene, p.p.m | 6,000 | 9 |
| Methylacetylene, p.p.m | 7,300 | 27 |
| Butadiene, p.p.m | 5,400 | 126 |

It should be noted that the concentration of propylene in the feed was 92.66 weight percent and the weight percent concentration in the product based on the feed rather than the effluent is approximately 92.9. Thus, there is by the process of the present invention, an apparent net gain of 0.24 weight percent in propylene content.

Table II below presents the analysis of the material desorbed from the zeolite.

Table II

| Component: | Weight percent |
|---|---|
| Benzene | 0.7 |
| Hexene | 1.3 |
| Toluene | 2.2 |
| $C_2$ alkylbenzene | 16.1 |
| Octene | 1.2 |
| $C_3$ alkylbenzene | 40.3 |
| Naphthalene | 6.9 |
| $C_4$ alkylbenzene | 11.0 |
| Methylnaphthalene | 3.0 |
| $C_5$ alkylbenzene | 7.2 |
| $C_2$ alkylnaphthalene | 2.1 |
| $C_6$ alkylbenzene | 2.4 |
| $C_3$ alkylnaphthalene | 1.2 |
| Cycloolefin and cyclodiolefin | 2.1 |
| Other | 2.3 |

In Table II, it should be noted that the greater portion of the desorbed oil is relatively low molecular weight aromatic hydrocarbons. None of the components of this oil were found to have molecular weights above 200.

The method whereby the ion-exchanged crystalline zeolite catalysts of the present invention are prepared is not critical. However, a particularly useful method comprises totally immersing a crystalline alkali and/or alkaline earth metallo-alumino-silicate in an aqueous solution comprising a salt of a polymerization promoting metal and a suitable solvent therefor. Heat is applied, if necessary, to cause the ion-exchange reaction to go forward. Generally, this will not be necessary since the reaction proceeds very well at ordinary room temperatures. After the ion-exchange reaction has gone to a satisfactory completion, the zeolite is filtered or otherwise removed from the solution. It is then thoroughly dried, preferably at moderately low temperatures, e.g., 125 to 350° C. for several hours. Care should be taken to avoid high temperatures, e.g., 350 to 600° C., which might cause damage to the crystalline zeolite. After drying, the ion-exchanged crystalline zeolite is reduced in a hydrogen stream at temperatures of 300 to 500° C.

The above method of preparation contemplates the use of already prepared crystalline zeolites. If it is desired to prepare the zeolite rather than obtain one already prepared, any of the conventional methods of preparation may be used. Among these conventional known methods are such as that described in U.S. Patent 2,972,643.

The ion-exchanged crystalline zeolite catalysts which are particularly within the scope of the present invention are those containing 0.5 to 12 weight percent of a polymerization promoting element such as zinc, cadmium, mercury, silver, copper, nickel, cobalt, etc. Such elements as zinc, cadmium and silver are somewhat preferred polymerization promoting metals in the catalyst of the present invention with zinc and cadmium being the most preferred. Among the crystalline zeolites which are particularly preferred in the present invention are the alkali and alkaline earth metallo-alumino-silicates having surface areas of 200 to 1200 square meters per gram and pore diameters of 6 to 15 angstroms. The preferred alkali and/or alkaline earth metallo-alumino-silicates are those containing as an alkali metal sodium and/or potassium and as an alkaline earth metal calcium and/or magnesium. It is also somewhat preferred that the zeolite have pore diameters of 10 to 15 angstroms. A particularly useful catalyst for the present invention is a crystalline sodium-calcium-alumino-silicate zeolite having pore diameters of 10 to 13 angstroms in which the sodium and calcium ions have been replaced by ion-exchange with zinc to the extent of placing 0.5 to 10 weight percent zinc in the zeolite.

The concentration of the more unsaturated hydrocarbon impurities in the olefin feeds of the present process may be virtually any amount. From the standpoint of commercial application and practicality it is preferred that no more than 10 percent by weight of such impurities exist in the olefin feed. However, the present invention finds its most effective utility in purifying olefin hydrocarbon streams containing less than 2 percent by weight of the more unsaturated hydrocarbon impurities. Large quantities of such impurities necessitate too frequent desorption for practical operation of the present invention. If, however, the primary interest in the invention is to produce aromatics from polymerization of the more unsaturated hydrocarbons, e.g., diolefin and/or acetylenic hydrocarbons, then large concentrations of such hydrocarbons in the feed are desirable. The advantage found in utilizing the present inventive concept to produce aromatics is found in the fact that the molecular weight of the aromatic is rather effectively controlled. It appears that the size of the internal cavities of the crystalline zeolite limits the critical diameter of the aromatic molecules formed thereby limiting the molecular weight of the aromatic. Thus, by the proper choice of crystalline zeolite, the molecular weight of the aromatic formed by the polymerization of such hydrocarbons as diolefin and acetylene hydrocarbons may be controlled. It is then quite apparent that, though the present invention is directed primarily to the purification of olefin hydrocarbon streams by selectively polymerizing minor amounts of such hydrocarbon impurities as diolefin and/or acetylenic hydrocarbons to valuable aromatic hydrocarbons, it also finds excellent utility in the production of aromatic hydrocarbons of limited molecular weights merely by utilizing feeds containing greater amounts of such hydrocarbons. In the practical operation of the present invention, feeds containing diolefin and/or acetylenic hydrocarbons of less than 10 carbon atoms are preferred. Generally, the present selective polymerization process is most effective when applied to the purification of olefin hydrocarbon streams containing diolefin and/or acetylenic hydrocarbon impurities of less than 5 carbon atoms such as acetylene, propadiene, methyl acetylene, butadiene, ethyl acetylene, pentadiene and propyl acetylenes.

The catalytically active surface of the catalysts used herein is largely within the internal cavities of the zeolite crystals. Thus, for polymerization to take place the diolefin and/or acetylenic hydrocarbons must enter these internal cavities. It is then apparent that the present invention is applicable to only those olefin feeds which contain diolefin and/or acetylenic hydrocarbon molecules having critical diameters less than the diameters of the entry pores of the crystalline zeolite. The choice of zeolite will then dictate to a rather large extent the type of feed which may be processed according to the invention since it is obvious that a much greater variety of feeds may be processed with a zeolite having 15 angstrom pore diameters than one with pore diameters of only 6 angstroms.

The feeds to the present invention may contain in addition to olefins, diolefins and/or acetylenic hydrocarbons such other hydrocarbons as paraffin and naphthene hydrocarbons. These saturated hydrocarbons have no deleterious effect on the polymerization reactions. High concentrations of such hydrocarbons obviously should be avoided since they are merely dead weight to the process.

It will generally be preferred to maintain temperatures of 100 to 400° C. in the polymerization zone. A somewhat more preferred temperature range is from approximately 200 to 350° C. The pressures generally preferred for operation of the present selective polymerization process are from approximately atmospheric pressure to 500 p.s.i.g. In most instances, however, adequate results are obtained by operating the present invention at substantially atmospheric pressure.

Hydrocarbon space velocity in the present process may range from 50 to 1000 gaseous volumes of hydrocarbon per hour per volume of catalyst. It is more preferred, however, to maintain the space velocity within the range 50 to 500 gaseous volumes of hydrocarbon per hour per volume of catalyst and still more preferred to maintain a space velocity of 75 to 150 gaseous volumes of hydrocarbon per hour per volume of catalyst.

The method by which the hydrocarbon feed is contacted with the catalyst may be practically any method known to the art. The process may be one involving gas-solid or liquid-solid contact. It is generally somewhat preferred, however, to use a gas-solid contact. The zeolite catalyst bed may be stationary or fluidized. If fluidized, the zeolite may be in the form of dry powder or pellets or may be slurried in an appropriate liquid. The arrangement and design of the apparatus is not particularly critical to the present process so long as good engineering principles are followed.

What is claimed is:

1. A process for the purification of olefin hydrocarbons containing more unsaturated hydrocarbon impurities which comprises contacting an olefin hydrocarbon stream containing said more unsaturated hydrocarbon impurities with a crystalline zeolite having pore diameters of 6 to 15 angstroms, at least a portion of the ions of which have been exchanged with a polymerization promoting metal selected from the group consisting of zinc, cadmium, mercury, silver, copper, nickel and cobalt at temperatures of 100 to 400° C. and at pressures of from atmospheric to 500 p.s.i.g.

2. The process of claim 1 wherein the crystalline zeolite is selected from the group consisting of alkali metallo-alumina-silicates, alkaline earth metallo-alumino-silicates and alumino-silicates containing both alkali and alkaline earth metals.

3. The process of claim 1 wherein the concentration of polymerization promoting metal in the ion-exchanged crystalline zeolite is 0.5 to 12 weight percent.

4. The process of claim 1 wherein the hydrocarbons contained in the impure olefin stream have less than 10 carbon atoms.

5. A process for the purification of olefin hydrocarbons containing impurities selected from the group consisting of diolefin and acetylenic hydrocarbon by the selective polymerization of said impurities, the process comprising contacting an olefin hydrocarbon stream containing no greater than 10 weight percent of diolefin and acetylenic hydrocarbon impurities at a temperature of 100 to 400° C., a pressure of atmospheric to 500 p.s.i.g. and a space velocity of 50 to 1000 gaseous volumes feed per hour per volume of catalyst with a catalyst comprising a synthetic crystalline metallo-alumino-silicate having pore diameters of 6 to 15 angstroms and in which the metallo portion contains a metal selected from the group consisting of sodium, potassium, calcium, magnesium and combinations thereof, and in which at least a portion of said metal ions have been exchanged by ion-exchange reaction with a polymerization promoting metal selected from the group consisting of zinc, cadmium and silver.

6. The process of claim 5 wherein the concentration of diolefin and acetylenic impurities in the olefin hydrocarbon stream is no more than 2 percent by weight.

7. The process of claim 5 wherein the temperature is 200 to 350° C.

8. The process of claim 5 wherein the pressure is substantially atmospheric pressure.

9. The process of claim 5 wherein the space velocity is 50 to 500 gaseous volumes of hydrocarbon feed per hour per volume of catalyst.

10. The process of claim 5 wherein the pore diameter of the catalyst is 10 to 15 angstroms.

11. The process of claim 5 wherein the synthetic crystalline metallo-alumino-silicate is a sodium-calcium-alumino silicate having pore diameters of 10 to 13 angstroms.

12. The process of claim 5 wherein the hydrocarbons in the impure olefin feed contain less than 5 carbon atoms.

13. A process for the purification of propylene stream containing impurities selected from the group consisting of $C_3$ and $C_4$ diolefin and acetylenic hydrocarbons by the selective polymerization of said impurities, the process comprising contacting said impure propylene stream with a catalyst comprising crystalline sodium-calcium-alumino silicate having pore diameters of 10 to 13 angstroms which has been base exchanged with a zinc salt, at a temperature of 200 to 350° C., a pressure of substantially atmospheric and a space velocity of 50 to 500 gaseous volumes of feed per hour per volume of catalyst.

14. The process of claim 13 wherein the space velocity is 75 to 150 gaseous volumes of hydrocarbon per hour per volume of catalyst.

References Cited by the Examiner

UNITED STATES PATENTS

| | | | |
|---|---|---|---|
| 2,829,182 | 4/1958 | King | 260—677 |
| 2,971,903 | 2/1961 | Kimberlin et al. | 260—673 |
| 2,972,643 | 2/1961 | Kimberlin et al. | 260—673 |
| 2,992,283 | 7/1961 | Eng | 260—673 |

PAUL M. COUGHLAN, *Primary Examiner.*

ALPHONSO D. SULLIVAN, *Examiner.*